United States Patent [19]
Weisman

[11] Patent Number: 5,323,193
[45] Date of Patent: Jun. 21, 1994

[54] FILM TRAP FOR A MOTION PICTURE PROJECTOR

[75] Inventor: Richard Weisman, N. Hollywood, Calif.

[73] Assignee: Sony Dynamic Digital Sound Inc., Culver City, Calif.

[21] Appl. No.: 54,560

[22] Filed: Apr. 28, 1993

[51] Int. Cl.$^5$ .................................................. G03B 1/48
[52] U.S. Cl. ....................................... 352/221; 352/225
[58] Field of Search ................. 352/221, 223, 225, 227

[56] References Cited

U.S. PATENT DOCUMENTS

| | | | |
|---|---|---|---|
| 1,828,768 | 10/1931 | Dina | 352/224 |
| 1,966,684 | 7/1934 | Pollock | 352/224 |
| 1,991,870 | 2/1935 | Schulz | 352/228 |
| 3,735,939 | 5/1973 | Inaga | 352/72 |
| 5,048,948 | 9/1991 | Johnson | 352/184 |
| 5,088,813 | 2/1992 | Wakefield | 352/183 |

Primary Examiner—Michael L. Gellner
Assistant Examiner—Eddie C. Lee
Attorney, Agent, or Firm—Pasquale Musacchio; Jerry A. Miller

[57] ABSTRACT

An improved film trap for a motion picture projector. The film trap includes a runner assembly having first and second runner elements each having a reduced thickness. The reduced thickness of the first and second runner elements enables the first and second runner elements to contact a first side of the filmstrip such that only a portion of the filmstrip which includes the sprocket holes is contacted by the first and second runner elements. The film trap further includes first and second pressure bands having a reduced thickness substantially equivalent to the first and second runner elements thickness. The first and second pressure bands urge the filmstrip against the first and second runner elements by contacting a second side of the filmstrip such that only a portion of the filmstrip which includes the sprocket holes is contacted by the first and second pressure bands. In addition, the film trap includes a pair of tension shoes having a top surface including at least one relief notch and which is coated with a relatively low friction material such as TEFLON TM. The reduced thicknesses and the relief notch reduce the contact area between the filmstrip and the first and second runner elements, first and second pressure bands and the tension shoes. The reduction in contact area in conjunction with the TEFLON TM coating on the tension shoes reduces the amount of surface damage on the filmstrip incurred by advancing the filmstrip through the film trap. Consequently, the number of times that the filmstrip may be processed through the film trap is substantially increased before replacement of the filmstrip because of surface damage sufficient to hinder reading of the soundtrack by sound reproducing equipment.

13 Claims, 5 Drawing Sheets

FILM TRAP FOR A MOTION PICTURE PROJECTOR

FIELD OF THE INVENTION

This invention relates to motion picture projectors and more particularly, to an improved film trap for a motion picture projector.

BACKGROUND OF THE INVENTION

A motion picture filmstrip generally includes a series of pictures and at least one soundtrack. Such filmstrips are typically used in conjunction with a motion picture projector to provide an optical effect wherein the pictures appear as a continuous picture having objects that are in motion. Typically, the motion pictures are projected on a screen. Many projectors further include means for reproducing the soundtrack in a synchronized manner with the picture projection. In this regard, reference is made to U.S. Pat. No. 4,009,949 entitled THREADING AND SYNCHRONIZATION FOR SOUND MOTION PICTURE PROJECTOR which issued to Nupnau on Mar. 1, 1977 and assigned to Bell & Howell Co. Therein is disclosed an automatic threading and image-sound synchronization system. In this system, the correct image frame to sound spacing of a filmstrip is established during threading of the projector by using a fixed loop accumulator and existing projector components.

Many techniques have been utilized to provide a soundtrack for a motion picture. One technique uses a magnetic medium similar to that used for magnetic recording tape. A soundtrack is then formed by applying the magnetic medium onto a motion picture filmstrip. However, this technique has disadvantages. A disadvantage is that the recording medium does not adhere well to the filmstrip. This results in a relatively short film life. In addition, the recording medium typically used is abrasive, which erodes and degrades the magnetic playback head, thus rendering it inoperable.

Another technique includes the formation of an analog optical sound recording on the filmstrip. One such recording is known as a variable area recording. This type of recording provides a soundtrack having optically translucent or opaque areas whose width varies according to the instantaneous amplitude of the sound. During movie projection, the soundtrack is illuminated from behind by a lamp and is viewed in front through a slit by a photocell. As the filmstrip advances, the photocell receives an amount of light that varies in accordance with the varying width of the varying translucent or opaque areas of the soundtrack. The photocell produces a corresponding voltage which is then utilized to reproduce the sound. In another type of optical recording, a soundtrack is configured such that it conforms to a curve that is empirically derived to provide the best compromise between signal to noise ratio, dynamic range and frequency response. This type of soundtrack is known in the art as the "Academy" soundtrack.

Digital optical recordings have also been used to provide a soundtrack. Generally, such recordings are formed by converting analog sound signals to digital sound signals. A filmstrip is then exposed to light which is modulated in accordance with the digital sound signals to form a digital soundtrack on the filmstrip. Digital soundtracks have many advantages. One advantage is increased resistance to audible degradation due to surface scratches or contaminants on the filmstrip that are caused by repeated use. In addition, digital soundtracks substantially reduce the amount of hiss and noise associated with analog soundtracks. As such, an increasing number of motion pictures include a digital optical soundtrack.

However, many movie theaters do not have projectors that are equipped to reproduce a digital optical soundtrack. Consequently, it is desirable to provide a motion picture having a standard analog optical soundtrack and a digital optical soundtrack. This would insure compatibility with theaters having projectors with either analog or digital sound reproduction systems. In this regard, reference is made to U.S. Pat. No. 4,306,781 entitled MULTI-CHANNEL SOUND AND DATA SYSTEM which issued on Dec. 22, 1981 to Mosely. This patent discloses a multi purpose sound/data system for motion picture film. As described therein, this system is capable of recording and reproducing digital and/or analog data such that there is no interference between different information channels.

U.S. Pat. No. 4,600,280 entitled DIGITAL AUDIO RECORDING/PLAYBACK SYSTEM FOR MOTION PICTURE FILM which issued to Clark on Jul. 15, 1986 describes a configuration for a filmstrip having digital and analog soundtracks. In this configuration, the filmstrip includes a three channel digital soundtrack extending along the length of filmstrip between the right sprocket holes and the picture frames. In addition, the film strip includes two conventional variable area soundtracks positioned between the left sprocket holes and the picture frames.

The filmstrip further includes a digital optical soundtrack which is formed in sublayers underneath the outside surfaces of the filmstrip. This soundtrack is formed on a portion of the filmstrip which includes an area between each of the righthand sprocket holes. The soundtrack further includes an area between each of the lefthand sprocket holes. In addition, the digital optical soundtrack may extend from the right edge to the righthand sprocket holes and/or the left edge to the lefthand sprocket holes. As such, the filmstrip is compatible with movie theaters having analog and digital sound reproduction systems. Another application having subject matter related thereto is PCT Application WO 92/14239, entitled STORAGE MEDIUM AND APPARATUS AND METHOD FOR RECOVERING INFORMATION FROM SUCH MEDIUM BY OVERSAMPLING, published Aug. 20, 1992.

Conventional projectors include a sound head for reading a soundtrack and reproducing sound in accordance with the soundtrack. In addition, such projectors include a drive sprocket and guide rollers positioned between a filmstrip supply reel and a take-up reel. The drive sprocket includes teeth which coact with drive sprocket holes in the filmstrip to advance the filmstrip past an aperture plate. Such projectors further include tension shoes for maintaining the filmstrip in contact with the drive sprocket. Additionally, projectors include a film trap having a pair of raised runners and pressure bands. The runners and pressure bands provide controlled movement of the filmstrip as the filmstrip is advanced past the aperture plate. Each edge of the filmstrip is placed in contact with each of the runners, pressure bands and tension shoes. Consequently, over a period of time the outside surfaces of both edges of the filmstrip become scratched or damaged as the filmstrip is advanced against the runners, pressure bands and tension shoes. These damaged surfaces may prevent a substantial portion of an optical soundtrack located in sublayers within the edges of the filmstrip from being read correctly by the sound head of the projector. This is a disadvantage since the soundtrack cannot be reproduced clearly or accurately by the sound head. By way of example, it has been determined that a filmstrip having a digital optical soundtrack located on each edge of the filmstrip is rendered unusable after the filmstrip is processed a maximum of approximately ten cycles through a conventional film trap. This amount is substantially less than the amount of cycles that the filmstrip may be processed before replacement if only the analog soundtrack of the filmstrip is used to reproduce sound. As such, use of the digital soundtrack to reproduce sound necessitates relatively early replacement of the motion picture and undesirably increases cost.

Consequently, it is an object of the present invention to provide a film trap which substantially reduces the amount of surface wear on each edge of a filmstrip. It is a further object to increase the number of cycles through which a motion picture filmstrip may be processed before replacement when using a digital optical soundtrack located within each edge of the filmstrip.

SUMMARY OF THE INVENTION

A film trap for a motion picture projector having a light source, projection optics and a drive sprocket for advancing a motion picture filmstrip through the film trap, the filmstrip including a soundtrack extending between a first sprocket hole portion to a first edge of the filmstrip and between a second sprocket hole portion to a second edge of the filmstrip. The film trap includes a plate element having a top end and bottom end, a first aperture and means for securing the plate element to the projector such that the first aperture is in light communication with the light source. The film trap further includes a first strap element and a second strap element each having a first end and a second end, wherein each first end is affixed to the top end of the plate element and each second end is affixed to the bottom end of the plate element such that the first and second strap elements are spaced apart and span above the plate element. In addition, the film trap includes a housing having a mounting surface, a channel member affixed to the mounting surface, a second aperture and means for securing the housing to the projector such that the second aperture is in light communication with the projection optics. The channel member includes a base element positioned between first and second elongated runner elements each extending above the base element to form a substantially U-shaped runner member wherein the filmstrip can be positioned between the first runner element and the first strap element and between the second runner element and the second strap element such that the first runner element and the first strap element contact substantially only the first portion of the filmstrip and the second runner element and the second strap element contact substantial only the second portion of the filmstrip.

DETAILED DESCRIPTION OF THE INVENTION

The present invention will now be explained by referring to the following description in conjunction with FIGS. 1-7 wherein like elements are designated by like reference numerals.

Figure 1:
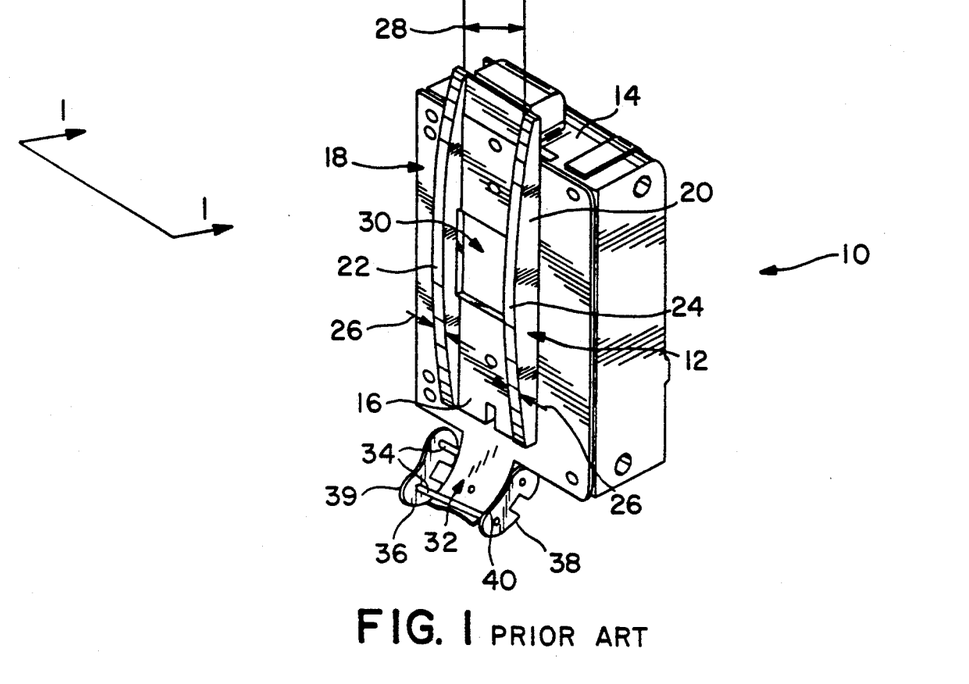
FIG. 1 is a perspective view of a prior art runner assembly.

A conventional film trap includes a runner assembly and a pressure band assembly. Referring to FIG. 1, a perspective view of a prior art runner assembly 10 is shown. The runner assembly 10 includes a channel member 12 and an enclosure 14. The channel member 12 includes a base section 16 positioned between first 18 and second 20 runner members which extend above the base section 16. The first 18 and second 20 runner members are spaced apart by a runner spacing 28. The first runner member 18 includes a first runner contact surface 22 and the second runner member 20 includes a second runner contact surface 24. The first 22 and second 24 runner contact surfaces each have an arcuate shape and a first runner thickness 26. By way of example, the first runner thickness 26 may be approximately 0.160 inch and the runner spacing may be approximately 1.3 inch. In addition, the channel member 12 and enclosure 14 each include a first aperture 30. As will be described, the runner assembly 10 is secured to a motion picture projector having projection optics such that the first aperture 30 is in light communication with the projection optics.

A curved member 32 extends outwardly from the bottom of the enclosure 14. The curved member 32 includes elongated fasteners 34 which extend from left and right sides of the curved member 32. The runner assembly 10 further includes first 36 and second 38 tension shoes. The first tension shoe 36 is secured on the left side of the curved member 32 and the second tension shoe 38 is secured on the right side of the curved member 32 by the fasteners 34. The first tension shoe 36 includes a first shoe contact surface 39 and the second tension shoe 38 includes a second shoe contact surface 40. The first 39 and second 40 shoe contact surfaces each have an arcuate shape and a relatively thin configuration. The first 36 and second 38 tension shoes serve to hold a filmstrip against a drive sprocket as will be described.

Figure 2:
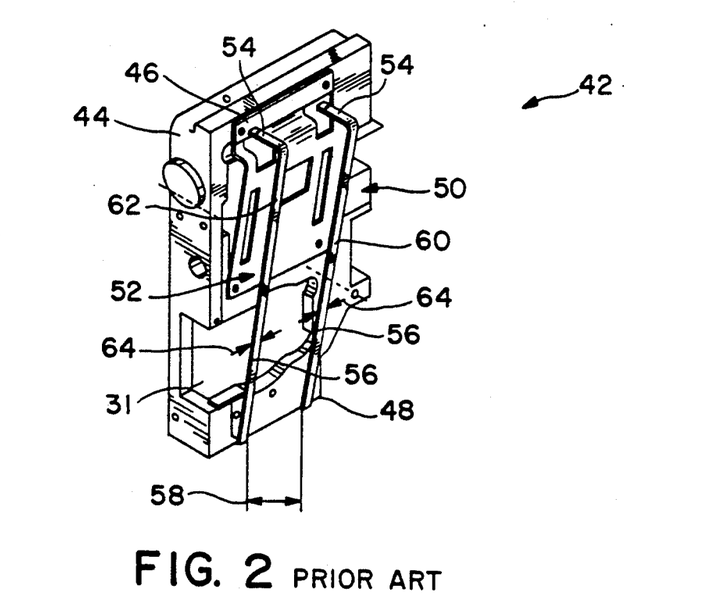
FIG. 2 is a perspective view of a prior art pressure band assembly.

Referring to FIG. 2, a perspective view of a pressure band assembly 42 is shown. The pressure band assembly 42 includes a mounting plate 44 having a top end 46 and a bottom end 48. The pressure band assembly 42 further includes first 50 and second 52 pressure bands each of which are fabricated from a resilient metal material. The first 50 and second 52 pressure bands each include a short section 54 and an elongated section 56. As such, the elongated 56 and short 54 sections form an inverted L shape. The short section 54 is affixed to the top end 46 of the mounting plate 44 such that each short section 54 extends above mounting plate 44. Each elongated section 56 is affixed to the bottom end 48 of the mounting plate 44 such that each elongated section 56 is angled downwardly toward the bottom end 48 of the mounting plate 44. Consequently, a clearance area is formed between the first 50 and second 52 pressure bands and the mounting plate 44. The first 50 and second 52 pressure bands are spaced apart by a band spacing 58 which is substantially similar to the runner spacing 28. In addition, the first 50 pressure band includes a first band contact surface 60 and the second pressure band 52 includes a second band contact surface 62. The first 60 and second 62 band contact surfaces each have a first band thickness 64 which is substantially similar to the first runner thickness 26. In use, the pressure band assembly 42 is positioned against the runner assembly 10 such that the first band contact surface 60 mates with the first runner contact surface 22 and the second band contact surface 62 mates with the second runner contact surface 24 as will be described. This causes displacement and flexing of the first 50 and second 52 pressure bands into the clearance area. The pressure band assembly 32 further includes a second aperture 31. As will be described, the pressure band assembly 42 is affixed to a projector having a light source such that the second aperture 31 is in light communication with the light source.

Figure 3:
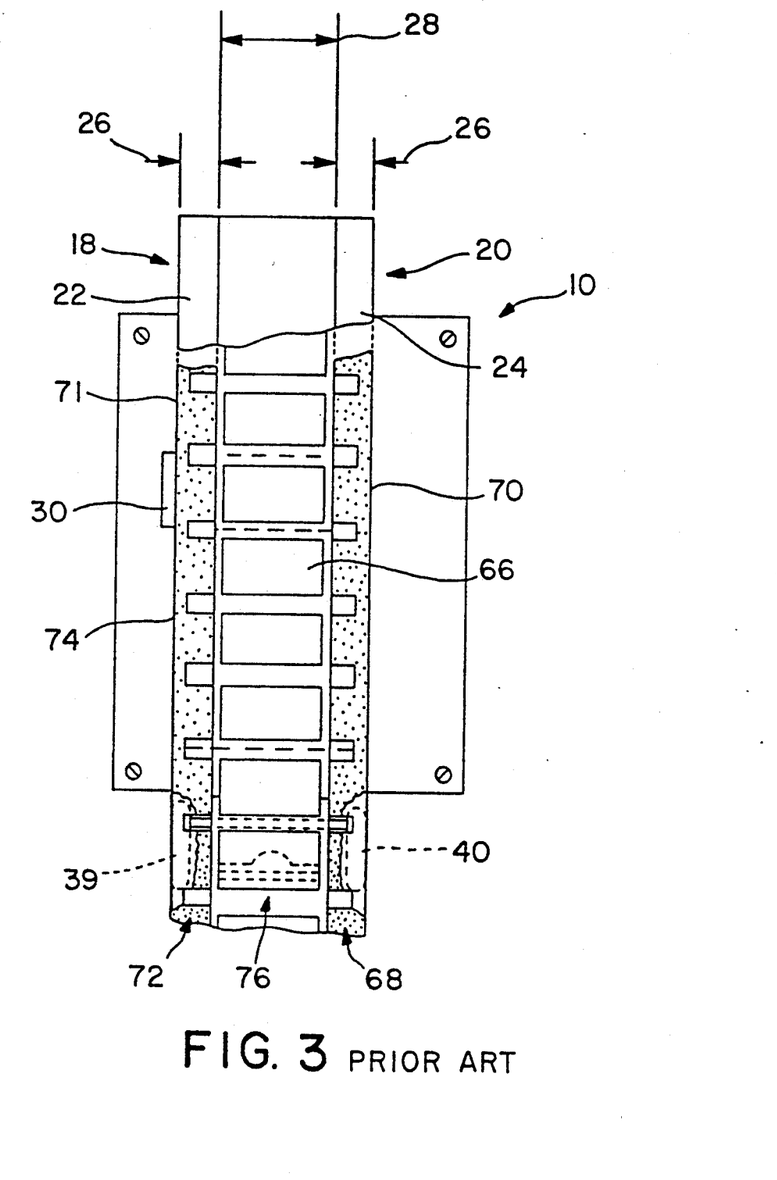
FIG. 3 shows the positioning of runner member and tension shoe contact surfaces with respect to a digital soundtrack.

Referring to FIG. 3, a view of the runner assembly 10 along line 1—1 of FIG. 1 is shown. In FIG. 3, a section of a 35 mm motion picture filmstrip 66 having an analog (not shown for purposes of clarity) and digital optical soundtrack 71 is shown positioned on the runner assembly 10. As such, FIG. 3 shows the prior art configuration for the relative placement of the filmstrip 66 with respect to the first 18 and second runner 20 members and the first 36 and second 38 tension shoes. In FIG. 3, an element which is underneath another element is shown as dashed lines.

The filmstrip 66 may have a standard configuration as specified in ANSI standard PH22.111, although other configurations may be used. The filmstrip 66 includes a right column of sprocket holes 68 and a right edge 70 and a left column of sprocket holes 72 and a left edge 74. In addition, a plurality of vertically arranged picture frames 76 are positioned between the left 72 and right 74 columns of sprocket holes. The analog soundtrack, which may be a variable area soundtrack, is formed in a portion of the area between the righthand sprocket holes 68 and the picture frames 76. As such, the configuration of the filmstrip 66 conforms to generally accepted standards in the industry and is compatible with movie theaters having analog sound reproduction systems. The digital soundtrack 71 is formed within sublayers of the filmstrip 66 in an area between each of the right sprocket holes 68.

The digital soundtrack 71 further includes an area between each of the left sprocket holes 72. In addition, the digital soundtrack 71 includes an area extending between the right edge 70 and the right sprocket holes 68 and between the left edge 74 and the left sprocket holes 72. For purposes of clarity, the digital soundtrack 71 is not shown in the areas of the filmstrip 66 where the first 39 and second 40 tension shoes are located. In addition, the digital soundtrack 66 is not shown in a top portion of the digital soundtrack to 71 illustrate the positioning of the first 22 and second 24 runner contact surfaces.

In this prior art configuration, the first runner thickness 26 and the runner spacing 28 are such that the first runner contact surface 22 and the second runner contact surface 24 are positioned underneath a substantial portion of the entire digital soundtrack 71. In addition, the first shoe contact surface 39 is positioned underneath a substantial portion of the digital soundtrack 71 located between the left edge 74 and the left sprocket holes 72. Similarly, the second shoe contact surface 40 is positioned underneath a substantial portion of the digital soundtrack 71 located between the right edge 70 and the right sprocket holes 68.

The filmstrip 66 is maintained in contact with the first 22 and second 24 runner contact surfaces by the first 60 and second 62 band contact surfaces. In addition, the filmstrip 66 is maintained in contact with the first 39 and second 40 shoe contact surfaces by a drive sprocket. As such, movement of the filmstrip 66 against the first 22 and second 24 runner contact surfaces, first 39 and second 40 shoe contact surfaces and the first 60 and second 62 band contact surfaces causes surface scratches or damage to the outside surfaces of the filmstrip 66 in the area of the digital soundtrack 71. The damaged surfaces substantially hinders a substantial portion of digital soundtrack 71 from being read by a sound head of a projector thus rendering the filmstrip unusable.

Figure 4:
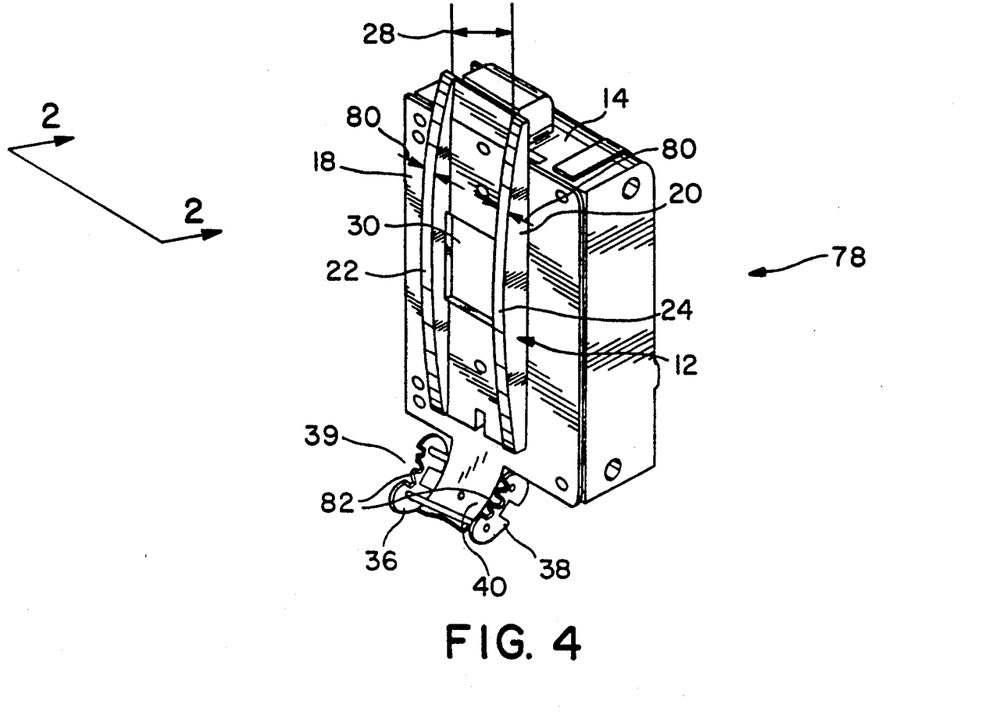
FIG. 4 is a perspective view of a runner assembly in accordance with the present invention having thinner runner members.

Referring to FIG. 4, a perspective view of a runner assembly 78 in accordance with the present invention is shown. In this embodiment, the first 18 and second 20 runner members each have a selected second runner thickness 80 which is relatively smaller than the first runner thickness 26. In addition, the first 18 and second 20 runners are spaced apart by the runner spacing 28 (FIG. 1). This sufficiently reduces the contact area of the first 22 and second 24 runner contact surfaces such that only the digital soundtrack 71 area between each of the left 72 and right 68 sprocket holes is contacted by the first 22 and second 24 runner contact surfaces as will be described. As such, the amount of surface damage on the filmstrip 66 in the area of the entire digital soundtrack 71 is substantially reduced.

In addition, the first 39 and second 40 shoe contact surfaces each include at least one relief notch 82. This sufficiently reduces the surface area of the first 39 and second 40 shoe contact surfaces to further reduce the amount of surface damage on the filmstrip 66 in the area of the digital soundtrack 71. By way of example, the notch may be 0.070 inch wide. It is understood that other suitable dimensions may be used. The first 39 and second 40 shoe contact surfaces further include a coating which reduces friction between the first 39 and second 40 shoe contact surfaces and the filmstrip 66. One such coating is polytetrafluoroethylene (PTFE) sold under the trademark TEFLON TM. This further reduces the amount of surface damage on the filmstrip 66 due to movement of the filmstrip 66 against the first 39 and second 40 shoe contact surfaces.

Figure 5:
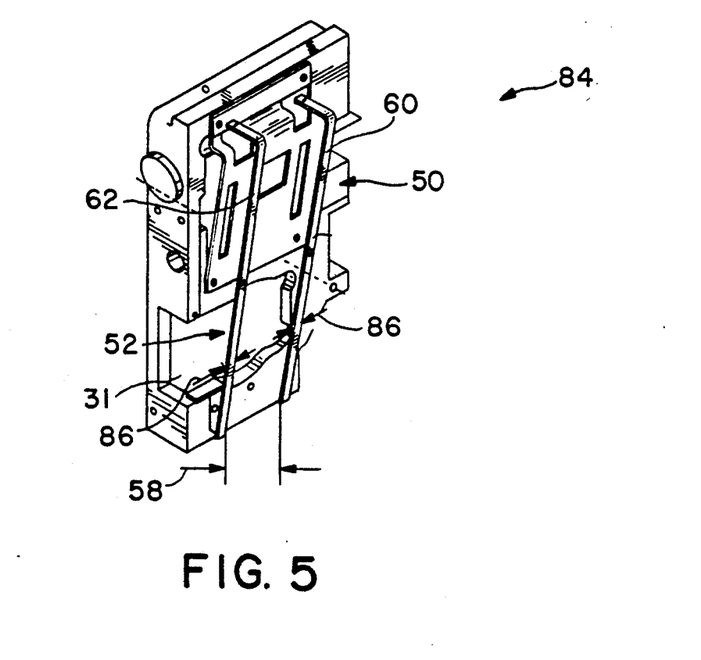
FIG. 5 is a perspective view of a pressure band assembly in accordance with the present invention having thinner pressure bands.

Referring to FIG. 5, a perspective view of a pressure band assembly 84 in accordance with the present invention is shown. In this embodiment, the first 50 and second 52 pressure bands each have a selected second band thickness 86 which is substantially similar to the second runner thickness 80 and relatively smaller than the first band thickness 64. In addition, the first 50 and second 52 pressure bands are separated by the band spacing 58. As such, the contact area of the first 60 and second 62 band contact surfaces is sufficiently reduced such that only the digital soundtrack 71 area between each of the left 72 and right 68 sprocket holes is contacted by the first 60 and second 62 band contact surfaces as will be described. Consequently, the amount of surface damage is substantially reduced in the areas of the digital soundtrack 71 on an opposite side of the filmstrip 66.

Figure 6:
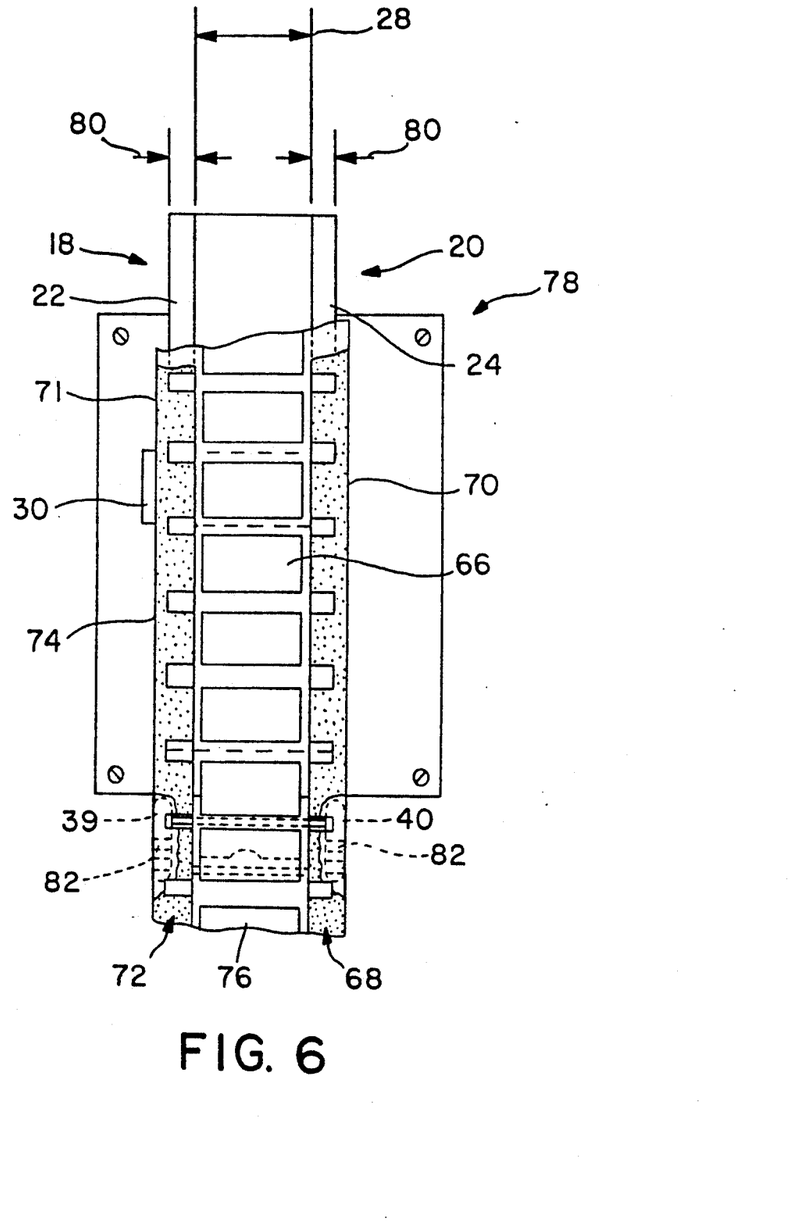
FIG. 6 shows the positioning of runner member and tension shoe contact surfaces with respect to the digital soundtrack in accordance with the present invention.

Referring to FIG. 6, a view of the runner assembly 78 along line 2—2 of FIG. 4 is shown. In FIG. 6, the filmstrip 66 previously described is shown positioned on the runner assembly 78 to illustrate the reduced contact surfaces.

In accordance with the present invention, the second runner thickness 80 and the runner spacing 28 are such that substantially only the portion of the digital soundtrack 71 located between each of the left sprocket holes 72 is contacted by the first runner contact surface 22. Similarly, the second runner contact surface 24 contacts substantially only the portion of the digital soundtrack 71 located between each of the right sprocket holes 68. Consequently, the amount of total surface wear on the filmstrip 66 in the area of the digital soundtrack 71 is reduced. By way of example, the second thickness may be approximately 0.100 inch.

In addition, the notches 82 reduce the surface area of the first 39 and second 40 shoe contact surfaces. Consequently, the contact area between the first shoe contact surface 39 and the portion of the filmstrip 66 between the left edge 74 and the left sprocket holes 72 is reduced. Similarly, the contact area between the second shoe contact surface 40 and the filmstrip 66 between the right edge 70 and the right sprocket holes 68 is reduced. As such, this further reduces the amount of total surface wear on the filmstrip 66.

Figure 7:
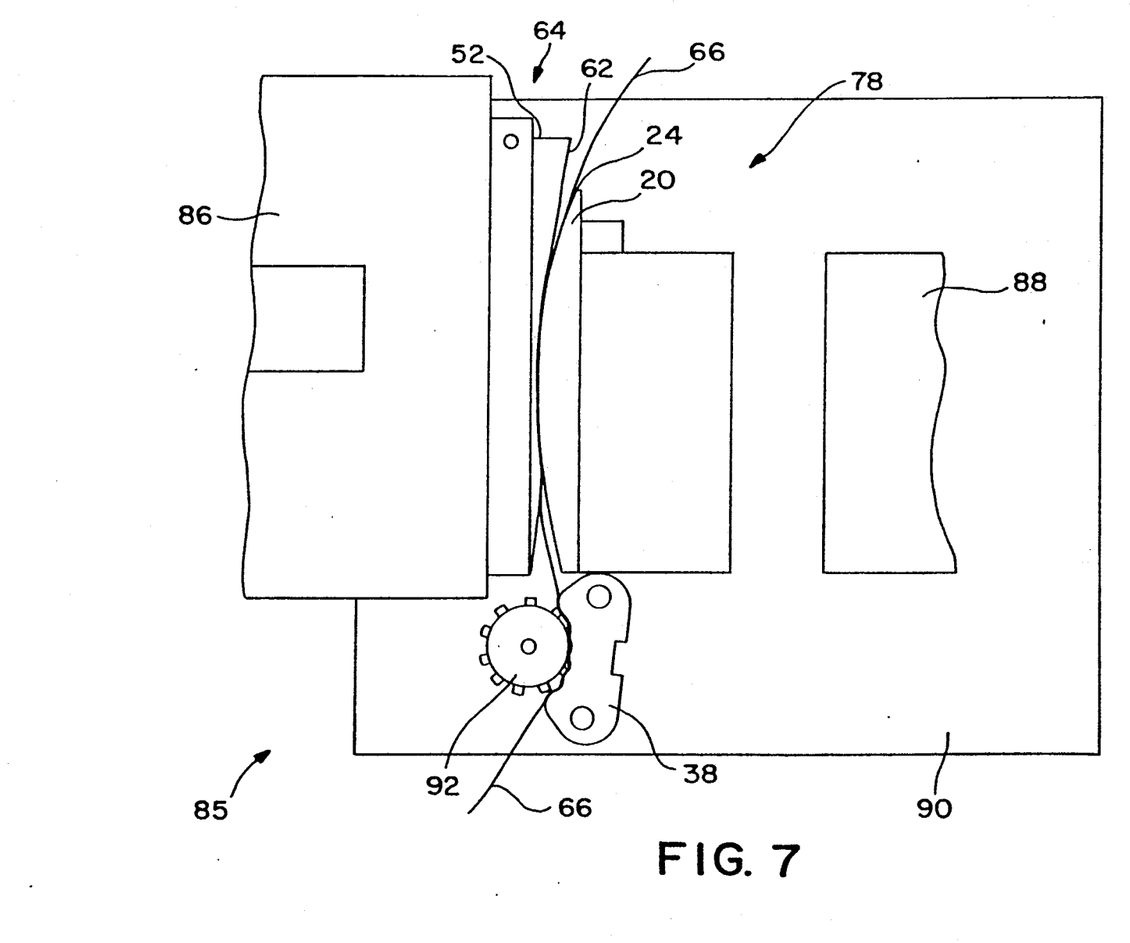
FIG. 7 is a partial view of a projector showing the positioning of a filmstrip in a film trap formed by the runner assembly and the pressure band assembly.

Referring to FIG. 7, the runner assembly 78 and pressure band assembly 84 in accordance with the present invention are shown are shown in a section of a projector 85 having projection optics 88, a backplate 90 and a housing 86 which includes a light source (not shown). The pressure band assembly 84 is affixed to the housing 86 such that the second aperture 31 (FIG. 5) is in light communication with the light source. The runner assembly 78 is moveably secured to the backplate 90 and is positioned such that the first aperture 30 (FIG. 4) is in light communication with the projection optics 88. In a closed position, the runner assembly 78 is positioned against the pressure band assembly 84 such that the first band contact surface 60 (not shown) mates with the first runner contact surface 22 (not shown) and the second band contact surface 62 mates with the second runner contact surface 24. This causes displacement and flexing of the first (not shown) 50 and second 52 pressure bands into the clearance area and thus forms a film trap. In an open position (not shown), a clearance is provided between the first 50 and second 52 pressure bands and the first 18 (not shown) and second 20 runner members. This enables threading of the filmstrip 66 through the film trap. In use, the filmstrip 66 is positioned between the runner assembly 78 and the pressure band assembly 84.

The projector 85 further includes a drive sprocket 92 which coacts with the left 72 and right 68 sprocket holes (FIG. 6) to advance the filmstrip 66 through the film trap. The first 36 (not shown) and second 38 tension shoes maintain the filmstrip 66 against the drive sprocket 92 to ensure proper registration of the filmstrip 66 with the drive sprocket 92.

As previously described, the area of the contact surfaces of the first 18 and second 20 runner members, the first 50 and second 52 pressure bands and the first 36 and second 38 tension shoes are sufficiently reduced such that the amount of times that the filmstrip 66 may be advanced through the film trap is substantially increased. By way of example, it has been determined that the filmstrip 66 may be advanced approximately 100 times through the film trap before replacement of the filmstrip 66 becomes necessary due to degradation of the edges of the filmstrip 66 sufficient to substantially hinder reading of the digital soundtrack 71 by the sound head.

Thus it is apparent that the present invention satisfies the objectives, aim and advantages set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A film trap for a motion picture projector having a light source, projection optics and a drive sprocket for advancing a motion picture filmstrip through said film trap, said filmstrip including a soundtrack extending between a first sprocket hole portion to a first edge of said filmstrip and between a second sprocket hole portion to a second edge of said filmstrip wherein said first portion includes a first set of sprocket holes and said second portion includes a second set of sprocket holes and said soundtrack extends between each of said sprocket holes in said first set and between each of said sprocket holes in said second set comprising:

a plate element having a top end and bottom end, a first aperture and means for securing said plate element to said projector such that said first aperture is in light communication with said light source;

a first strap element and a second strap element each having a first end and a second end, wherein each said first end is affixed to said top end of said plate elements and each said second end is affixed to said bottom end of said plate element such that said first and second strap elements are spaced apart and span above said plate element;

a housing having a mounting surface, a second apertures and means for securing said housing to said projector such that said second aperture is in light communication with said projection optics; and a channel member affixed to said mounting surface, said channel member having a base element positioned between first and second elongated runner elements each extending above said base element to form a substantially U-shaped runner member wherein said filmstrip can be positioned between said first runner element and said first strap element and between said second runner element and said second strap element such that said first runner element and said first strap element contact substantially only said first portion of said filmstrip between each of said sprocket holes in said first set and said second runner element and said second strap element contact substantially only said second portion of said filmstrip between each of said sprocket holes in said second set.

2. The film trap according to claim 1, wherein said first and second runner elements each have an arcuate shape.

3. The film trap according to claim 1, wherein said first and second strap elements each have an inverted substantially L-shape.

4. The film trap according to claim 1, wherein said first and second strap elements are each approximately 0.100 inches wide.

5. The film trap according to claim 1, wherein said first and second runner elements are each approximately 0.100 inches wide.

6. A tension shoe for a motion picture projector film trap, wherein said tension shoe maintains a filmstrip against a drive sprocket in said projector, said filmstrip including a first soundtrack area extending between a first sprocket hole portion to a first edge of said filmstrip and a second soundtrack area extending between a second sprocket hole portion to a second edge of said filmstrip comprising:

first and second spaced apart stationary elements affixed to said film trap adjacent said drive sprocket, said first and second elements each having a slender configuration and a top surface having at least one relief notch wherein each said top surface contacts said first and second soundtrack areas.

7. The tension shoe according to claim 6, wherein said top surface is coated with a relatively low fraction material.

8. The tension shoe according to claim 6, wherein said relief notch is approximately 0.070 inches wide.

9. A film trap for a motion picture projector having a light source, projection optics and a drive sprocket for advancing a motion picture filmstrip through said film trap, said filmstrip including a first soundtrack area extending between a first sprocket hole portion to a first edge of said filmstrip and a second soundtrack area extending between a second sprocket hole portion to a second edge of said filmstrip, comprising:

a plate element having a top end and a bottom end, a first aperture and means for securing said plate element to said projector such that said first aperture is in light communication with said light source;

a first strap element and a second strap element each having an inverted substantially L-shaped configuration and a first end and a second end wherein each said first end is affixed to said top end of said plate element and each said second end is affixed to said bottom end of said plate element such that said first and second strap elements are spaced apart and span above said plate element and wherein said first strap element has a width substantially equivalent to said first portion of said filmstrip and said second strap element has a width substantially equivalent to said second portion of said filmstrip;

a housing having a mounting surface, a second aperture and means for securing said housing to said projector such that said second aperture is in light communication with said projection optics; and a channel member affixed to said mounting surface, said channel member having a base element positioned between first and second elongated runner elements each having an arcuate shape and each extending above said base element to form a substantially U-shaped runner member wherein said first runner element has a width substantially equivalent to said first portion of said filmstrip and said second runner element has a width substantially equivalent to said second portion of said filmstrip and wherein said filmstrip can be positioned between said first runner element and said first strap element and between said second runner element and said second strap element such that said first runner element and said first strap element contact substantially only said first portion of said filmstrip and said second runner element and said second strap element contact substantially only said second portion of said filmstrip; and first and second spaced apart tension shoes affixed to said housing, wherein each said first and second tension shoe is stationary and includes a contact surface for contacting said first and second soundtrack area to maintain said filmstrip against said drive sprocket and wherein each said contact surface includes at least one relief notch.

10. The film trap according to claim 9, wherein said first and second strap elements are each approximately 0.100 inches wide.

11. The film trap according to claim 9, wherein said first and second runner elements are each approximately 0.100 inches wide.

12. The film trap according to claim 9, wherein each said contact surface is coated with a relatively low friction material.

13. The film track according to claim 9, wherein said relief notch is approximately 0.070 inches wide.

* * * * *